March 5, 1957 W. H. GRAVERT 2,784,294
WELDING TORCH
Filed March 18, 1954
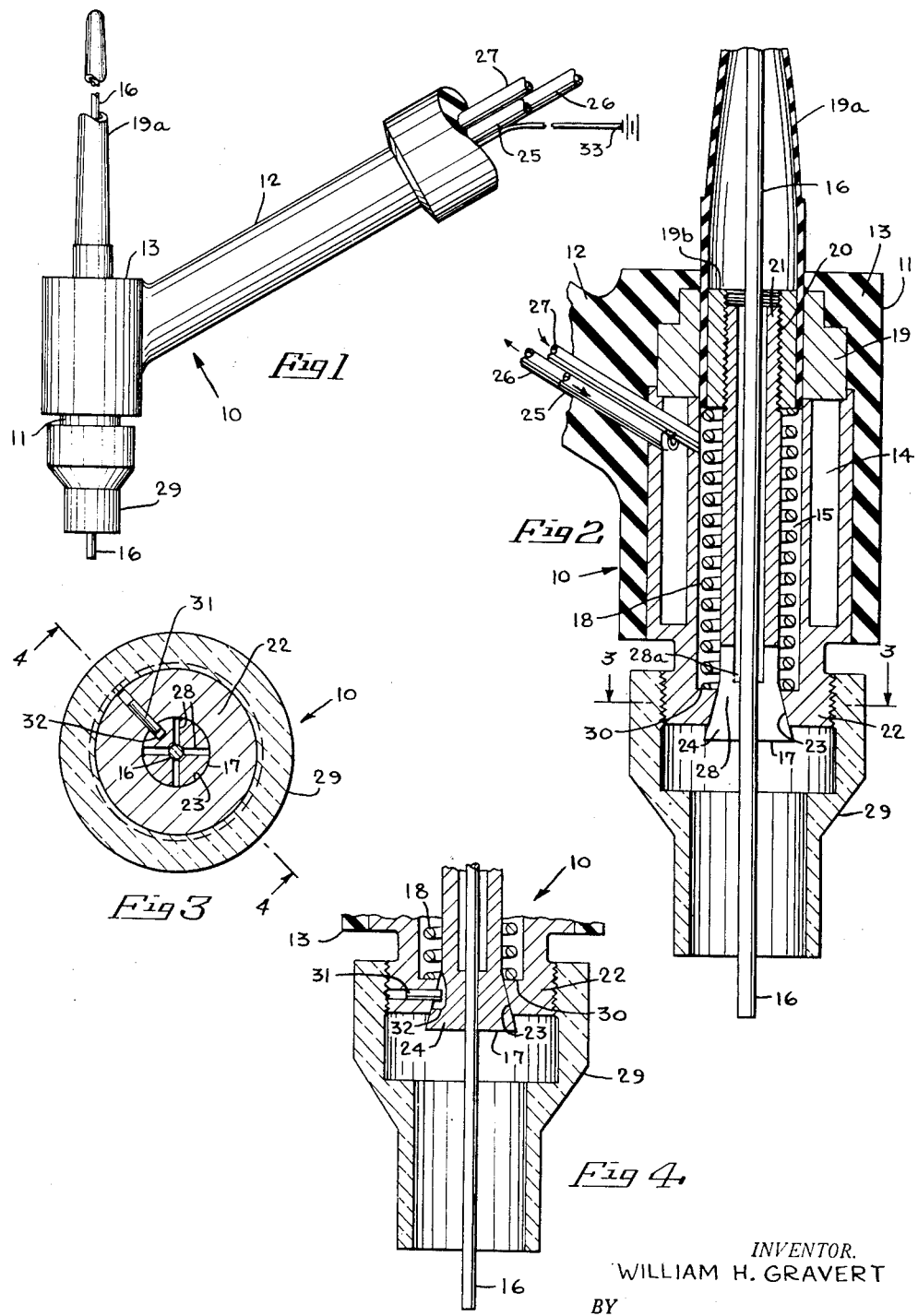
INVENTOR.
WILLIAM H. GRAVERT
BY
Joseph F. Padlon
Attorney

United States Patent Office 2,784,294
Patented Mar. 5, 1957

2,784,294
WELDING TORCH

William H. Gravert, Port Washington, N. Y.

Application March 18, 1954, Serial No. 417,021

7 Claims. (Cl. 219—75)

This invention relates to a welding torch, and more particularly to a water cooled, highly insulated welding torch having readily adjustable means therein for the welding rod in any desired protruded length from the device.

An object of my invention is to provide an electrically operated torch wherein the welding rod is firmly held and quickly adjustable so as to extend from the body of the torch as desired.

Another object of my invention is to provide an integrally insulated torch made of a minimum of parts and in which the electrode rod is readily adjustable and removable without completely disassembling the torch.

Still another object of my invention is to provide a welding torch wherein the composite parts easily and conveniently hold a collet for an electrode rod, which collet can be effectively removed without completely taking apart the torch and which collet can be easily loosened or tightened to adjust the welding rod as it is being shortened due to use.

One further object of my invention is to provide a torch of relatively simple and compact construction which is completely insulated and which utilizes the water cooling means for electrical conduction.

A still further object of my invention is to provide a torch which is completely insulated and sealed at the handle and body portions thereof.

Other objects and features of the invention will become apparent from the herein following description taken in conjunction with the accompanying drawings wherein:

Fig. 1 is an elevation of a torch embodying my invention;

Fig. 2 is a longitudinal fragmental sectional view of Fig. 1;

Fig. 3 is a cross sectional view taken on line 3—3 of Fig. 2, and

Fig. 4 is a fragmental sectional detailed view taken on line 4—4 of Fig. 3.

Referring now to the drawings, wherein like numbers refer to like parts thruout, my invention relates to an electro-welding torch 10 having a body portion 11 and a handle 12. Said torch as shown is tightly covered or coated with a nonconducting material 13 of high insulation value, such as rubber, neoprene, polyester resin, nylon, silicone rubber or any type of a plastic material which is formed on the torch by means of molding or dipping and the like and which forms an integral part of the torch body and handle.

The body portion 11 as shown has a concentric water jacket 14 with an axial opening 15 for the passage therethru of an electrode rod 16, an axially open collet 17 for said rod 16 and a tension spring member 18. At the top of jacket 14 is a back member 19 in which fits a cap 19a with an insert member 19b having a recessed internally threaded opening 20 wherein the threaded terminal portion 21 of collet 17 is adjustably fitted.

Jacket 14, furthermore, as shown, has a forward externally threaded terminal portion 22 extending from the concentric portion thereof, with an axial, flared opening 23 to accommodate the flared, partly protruding end 24 of the collet 17. Furthermore, said jacket 14 has a water inlet 25 and a water outlet 26 connected therewith for cooling the torch 10 during its use. In addition, there is provided, but extending thru the jacket 14 into the center thereof a gas inlet 27, for an inert gas which is forced down the interior thereof. Said inlets 25 and 27 and outlet 26 pass thru handle 12 as shown in Fig. 1 and are connected with an outside source of water or coolant, not shown.

Collet 17, as shown, is sufficiently long to extend thru the jacket 14 and is axially open to accommodate rod 16 as indicated.

Its forward terminal portion 24 is flared and provided with a plurality of radial grooves or slots 28 which extend upwardly into the shank of the collet so that gas coming into the central opening or area 28a readily passes thru said slots 28 into the nozzle 29 of the torch, and out therefrom. It will be noted that nozzle 29 is large enough to permit gas to accumulate around the rod 16 during its use in welding. In order to form a tight fit of the collet in the jacket of the torch body and rigidly hold rod 16, spring 18 is provided against the screw action of cap 19a, said spring, as noted, resting against the seat 30 of the jacket portion 22 and against the end of insert 19b of cap 19a.

Nozzle 29 as shown may be of any non-conductive material, such as of porcelain or ceramic material and allows for the collection of accumulation of inert gas around the rod 16 during its use. Also, its upper portion as shown in Figs. 2 and 4 is internally threaded to accommodate terminal portion 22 of jacket 14.

Said collet as shown is readily adjustable and removable when cap 19a is pushed down or unscrewed so as to permit the desired movement of the rod as it is consumed. However, in order to facilitate such adjustment, I may provide a pin 31 set in terminal portion 22 and a slot 32 in the head of collet 17. The head end of said collet may be loosened or tightened by the action of cap 19a which is screwed to the rear end of collet 17. This adjustment will readily affect the rod 16.

Further, in accordance with my invention, it will be noted that the inlet water tube is in connection with a source of electricity 33 so as to supply current to the rod 16 during its use and operation. The highly insulated part 13 affords sufficient protection to the operator. Also, since the current is of high frequency and of relatively low voltage there is little likelihood of short circuiting in the device unless the insulation is split or broken away.

During the operation of the device if rod 16 during welding becomes shorter at the nozzle 29, cap 19a is partly pushed down to loosen the compression of spring 18 against the end 19b of the cap 19a whereupon the slotted parts of head 24 of collet 17 loosen and release their hold or clamping action on rod 16. The rod falls or its free end may be pulled outwardly of the head 24 and when the right or desired length of the rod is extended, then the cap 19a is tightened on the torch body.

From the foregoing it will be noted that according to my invention I provide an insulated torch with easily adjustable, compact means for extending a welding rod from a torch during its use without disconnecting the torch as heretofore. Also, there is always a positive grasping or clamping action on the rod.

While a preferred embodiment of my invention has been illustrated and described, it is to be understood that various changes as to form, use, arrangement of parts and materials may be made without departing from the spirit and scope of my invention as claimed.

I claim:

1. A welding torch comprising a body portion, concentric cooling means in the body portion, a welding rod extending thru the body portion, means for adjustably clamping the rod, and releasable tension spring means coaxial with the welding rod for controlling the clamping of the rod.

2. A torch according to claim 1 wherein there is provided water inlet and outlet means for the cooling means, and a source of inert gas for said rod when used.

3. A unitarily insulated electro-welding torch comprising a body portion, a concentric cooling jacket in said body, tension means inside said jacket, a collet extending thru said tension means and coaxial with the jacket and tension means, and means for operating said collet to adjust its hold on a welding rod extending thru the collet.

4. A torch according to claim 3 wherein the collet is flared and slotted at its forward portion and acts as a clamp for a rod extending therethru, and a nozzle extending from the body portion, said tension means being disposed intermediate the flared forward portion of the collet and the means for operating the collet.

5. A unitarily insulated electro-welding torch comprising a body portion, a concentric cooling jacket in said body, tension means inside said jacket, a collet extending through said tension means and coaxial with the jacket and tension means, said jacket being in communication with the cooling means and being provided with inert gas supplying means for the interior central opening of the jacket, said jacket accommodating coaxially in its interior said tension means, said collet being coaxial with and inside said spring, and a manually operable cap for said jacket adapted to act against the spring to permit adjustment of the rod.

6. In a welding torch a body portion having a unitary concentric water cooling jacket, a spring member extending coaxially thru the jacket, a collet extending thru the spring and acted on by the spring, and means extending into the jacket in connection with the collet adapted to act against the spring, said collet being adapted to clamp a rod extending therethru to hold the same at any desired length from the torch, said collet having a tapered slotted end, the cooling jacket having an axial opening for said collet, said opening being tapered to conform with the tapered end of the collet.

7. An integrally insulated torch comprising a body portion having water cooling means therein coaxial with said body portion, a welding rod holding collet extending through the last-named means, said collet having a slitted compressible terminal clamping portion, pushable capping means extending upwardly of the collet and connectible thereto, said capping means being adapted to retain a welding rod therein, tensioned means surrounding the collet normally acting against the capping means and the terminal portion of the collet to keep the slitted compressible terminal portion in contact with a rod extending through the collet, a nozzle for the body portion, and means in the jacket for fixing the collet in longitudinal position in the body portion.

References Cited in the file of this patent

UNITED STATES PATENTS

| | | |
|---|---|---|
| 1,963,915 | Kennedy | June 19, 1934 |
| 2,430,260 | Trott | Nov. 4, 1947 |
| 2,468,805 | Herbst | May 3, 1949 |
| 2,468,806 | Pilia | May 3, 1949 |
| 2,473,258 | Potter | June 14, 1949 |
| 2,512,706 | Anderson | June 27, 1950 |
| 2,512,707 | Anderson | June 27, 1950 |
| 2,532,807 | Girard et al. | Dec. 5, 1950 |